United States Patent Office 2,900,193
Patented Aug. 18, 1959

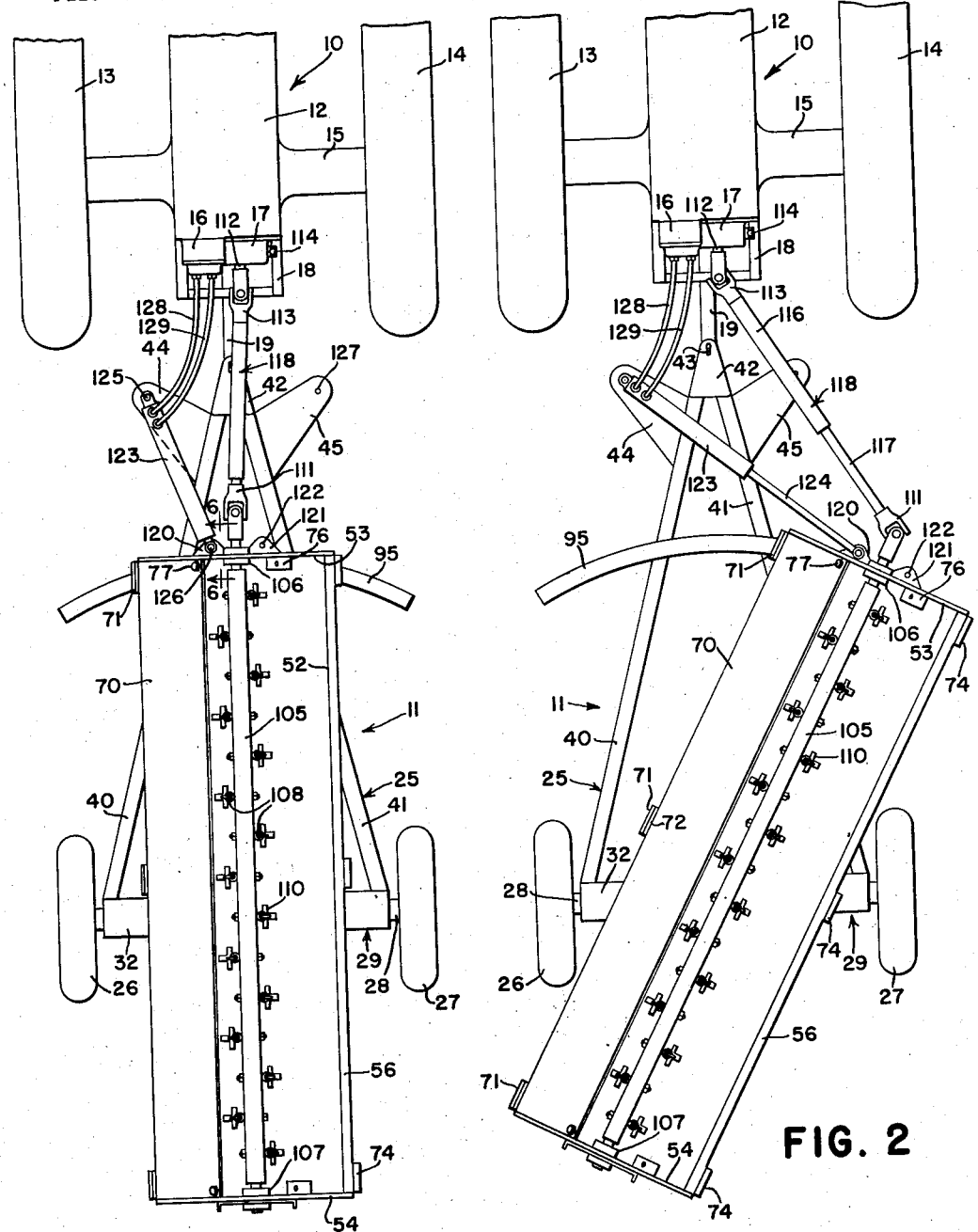

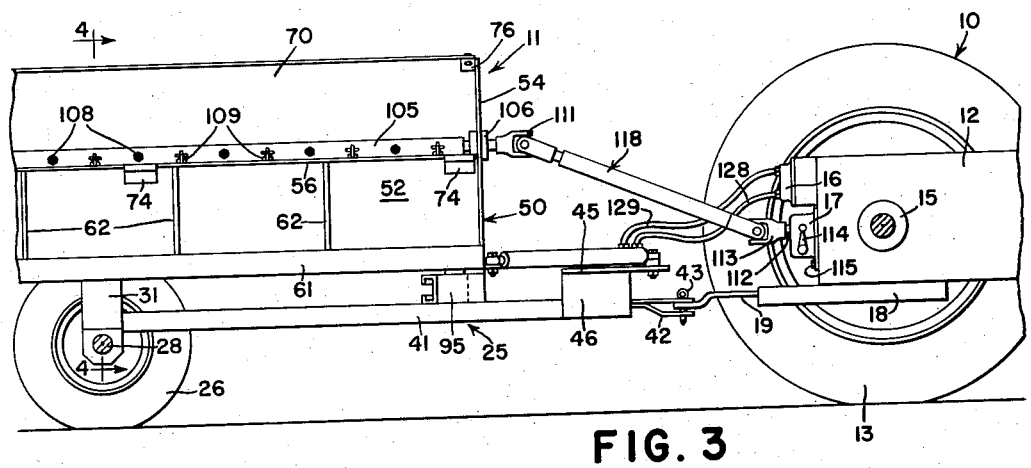
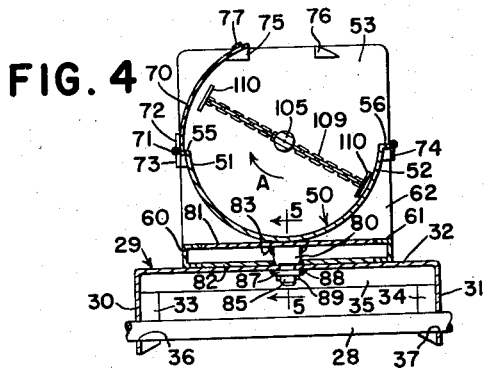
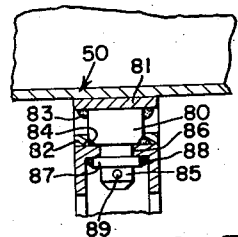
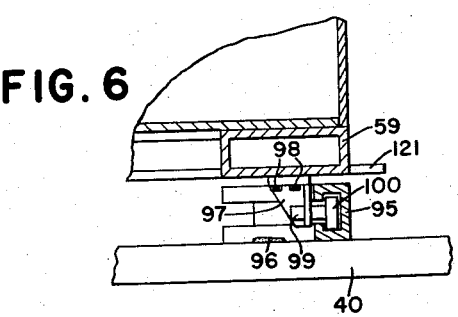

2,900,193

FLAIL-TYPE MANURE SPREADER

Billie L. Harriott, Moline, Ill., assignor, by mesne assignments, to Deere & Co., a corporation of Delaware Application February 5, 1958, Serial No. 713,383

8 Claims. (Cl. 275—3)

This invention relates to a material unloading implement adapted for attachment to a tractor or other type of vehicle. More particularly this invention relates to the vehicle frame and the manner of attachment of a material container on the frame.

This invention may be considered as an improvement of the material unloading implement set forth and described in a pending application of Keith D. Elwick, Ser. No. 663,074, filed June 3, 1957. In the structure set forth and described in that application, there is generally provided a rigid mobile implement frame having a fore-and-aft extending material container rigidly supported on the frame which includes an elongated body portion of U-shaped cross section closed at its front and rear ends by front and rear walls respectively. A fore-and-aft extending rotatable shaft is supported on the front and rear walls centrally between the side walls of the body portion. Mounted on the shaft are a plurality of chains which wind about the shaft and upon rotation of the shaft tend to unwind or extend themselves so as to feed material in the container upwardly and outwardly over one side wall of the container.

In the type of vehicle above described, the material leaving the container would normally be fed upwardly so as to clear the sides of the container. Since the primary use of the unloading implement is presently contemplated for use as a manure spreader, it is naturally desirous to avoid having the contents in the container move in the direction of the operator on the tractor. Quite obviously, therefore, there has been created a problem in the above type of spreader in which, should the operator be located on the windward side of the spreader, the effect of the wind on the material issuing over the side of the spreader will cause the material to be blown in the direction of the operator.

Further, should it be desired to spread heavy or light on the field, such cannot be obtained unless by changing the chains on the rotatable shaft or by providing a multi-speed drive for rotating the shaft. Also, in many instances it will be desirable to spread heavily on part of a field and lightly on other parts.

It is therefore the primary object of the present invention to provide in combination with the above described type of spreading mechanism means mounting the material container on the main frame which includes a vertical pivot effective to permit lateral swinging of the container relative to the main frame, the purpose being to move the container angularly relative to the direction of travel whereby the material in the container may be thrown from the container at an angle to the direction of travel.

It is a further object of this invention to provide with the above type of lateral swinging container, an extensible member in the form of a hydraulic cylinder between the frame and container, which operates as means for adjustably and accurately swinging the container on the vertical pivot so as to angularly adjust the container relative to the direction of travel.

It is still a further object of this invention to provide with the above described type of adjustment, a drive mechanism for rotating the rotatable shaft in the material container which is automatically adjustable to accommodate lateral swinging of the container and manually adjustable to rotate the shaft in either direction.

Other objects and advantages of the invention will become apparent to those skilled in the art as the nature of the invention becomes more apparent from the following description and a study of the accompanying drawings.

Fig. 1 is a plan view showing the rear portion of a tractor and associated material unloading implement having a longitudinally disposed material container in fore-and-aft alinement with the tractor body.

Fig. 2 is a view similar to Fig. 1 with the material container positioned angularly relative to the tractor body.

Fig. 3 is a partial sectional and side view of the forward portion of the material container and the rear portion of the tractor.

Fig. 4 is a sectional view taken substantially along the line 4—4 of Fig. 3.

Fig. 5 is a sectional view taken substantially along the line 5—5 of Fig. 4.

Fig. 6 is a sectional view taken substantially along the line 6—6 of Fig. 1.

The assemblage includes a tractor 10 and a material unloading implement 11 adapted for attachment to the tractor. The tractor 10 includes a fore-and-aft extending elongated body 12 and a pair of transversely spaced rear wheels 13, 14 supported on rear axle structure 15. The tractor 10 is provided with a conventional hydraulic system, indicated by its housing 16. The tractor is also provided with a power take-off shaft, not shown, but located under a gear housing 17. Rearwardly extending supporting framework 18 is fixed to the underside of the tractor body 12 and includes a rearwardly extending and laterally swinging drawbar 19.

The implement 11 includes a main frame 25 supported on a pair of transport wheels 26, 27 on opposite ends of a transverse axle 28. The axle 28 carries a transverse U-shaped frame member 29 having depending leg portions 30, 31 on opposite ends of a transverse elongated beam portion 32. The frame 29 is of channel construction having vertical flange portions shown in Fig. 4 at 33, 34 and 35. The leg portions 30, 31 are apertured as at 36, 37 to carry opposite ends of the axle 28.

A pair of forwardly elongated channel members 40, 41 have their rear ends fixed, as by welding which is not shown, to the flanges 33, 34 and converge forwardly therefrom to an apex portion having a clevis member 42 connected to the tractor drawbar 19, a pin 43 serving as the direct means of connection. Also fixed to the forward end of the channel members 40, 41 are a pair of outwardly extending brackets 44, 45 which are fixed to the upright portions of the channel members 40, 41 by vertical plate portions, the right plate portion 46 for the right bracket 45 being shown in Fig. 3. The plate portion for the opposite bracket 44 is identical and consequently while not shown on the drawings may be treated as similar to the portion 46.

A semi-cylindrical material container includes an elongated body 50 of U-shaped cross section including oppositely disposed upwardly extending side walls 51, 52. The body portion 50 is closed at its front and rear ends by front and rear end walls 53, 54. The forward end wall 53 is of rectangular shape and extends above the upper edges of the side walls 51, 52 and serves to prevent material from flowing forwardly of the elongated body 50. The rear wall 54 is of circular shape and is of such size to close the rear end of the body 50. The elongated body 50 has outwardly extending flanges 55, 56 extending from the upper edges of the side walls 51, 52.

A subframe serves as direct support for the elongated container and is composed of left and right fore-and-aft extending channel members 60, 61 respectively which are suitably cross braced by transverse channel member 59 at their front ends, and a similar channel member, not shown, at their rear ends. Supported on the channel members 60, 61 are a series of fore-and-aft spaced apart rib members 62, each of which has its upper edge concaved and formed to accommodate the lower surface of the U-shaped or semi-cylindrical body 50. The flanges 55, 56 rest against upper edges of the rib sections 42 and prevent rotation of the body 50 on the rib sections. The subframe in effect, therefore, serves to support the elongated body or container 50 in a cradle-like manner and the container may be removed from the subframe merely by raising it from the ribbed sections 62.

Supported on the left side wall 51 of the elongated body 50 is an upwardly extending shield or side extension 70 which may be treated as a continuation of the side 51 and which is hinged, as at 71, to the side wall 51. As may be seen in Fig. 4, the hinges 71 are divided into upper and lower portions 72, 73, the upper portion 72 of which is fixed to the lower edge of the shield 70 and the lower portion 73 which is fixed to the outer surface of the side wall 51. Also, as may be seen in Fig. 4, lower portions 74 of similar hinges are provided on the right side wall 52. As is obvious, should it be desired to remove the shield from the left side wall 51 and replace it on the right side wall 52, the hinge portions 74 will accommodate the upper hinge portions 72 of the shield member 70. Also provided on the front end wall 53 are rests 75, 76 for supporting the upper edge of the shield 70. A bolt 77 operates to secure the shield to the rests 75, 76. A similar arrangement is provided on the rear wall 54.

The subframe is supported on the main frame 25 by vertical pivot means which includes a vertically disposed solid cylindrical stub shaft 80 welded, as at 83, 84 between upper and lower cross braces 81, 82. Opposite ends of the cross braces 81, 82 are fixed to the inwardly extending flanges of the channel members 60, 61. The stub shaft 80 is reduced in cross section, as at 85, and extends through an aperture in the cross piece 32 of the U-shaped frame 29. The aperture 86 and the small end 85 of the shaft 80 offers a vertical pivotal connection between the subframe and material container and the main frame 25. The small end 85 of the shaft 80 is held against vertical movement in the aperture 86 by means of a collar 87 which is welded, as at 88, and a pin 89 which extends through the small end 85 and is adjacent to the lower surface of the collar 87.

For purposes of balance, the forward end of the subframe and material container is supported on a guide track 95 which is arcuate shaped to accommodate lateral swinging about the upright pivot 80. The rail 95 is a C-shaped channel and is fixed to the upper flanges of the channel members 40, 41 by welding 96. Depending from the front transverse box channel 59 is a bracket 97 which is fixed to the under surface of the box channel 59 by bolts 98. The depending portion of the bracket 97 supports its short stub shaft 99 which has a forward end carrying a roller 100. The roller 100 rides in the C-opening of the channel member 95.

Provided in the material container 50 is a fore-and-aft extending rotatable shaft 105 having its front and rear ends journaled, as at 106, 107 respectively, to the front and rear walls 53, 54 respectively. Fixed to the shaft 105 by means of eye bolts 108 is a series of axially spaced arm elements in the form of link chains 109. The chains 109 cary drags 110 on their outer ends. The rotatable shaft 105 is driven from the power take-off shaft on the tractor through means of an extensible drive shaft 118 connected at its rear end to the rotatable shaft 105 by means of a universal joint 111 and at its forward end to an output shaft 112 extending from the housing 17 and connected to the shaft 112 by means of a universal joint 113. The housing 17 contains therein a reversing mechanism, not shown, which is operated by a lever 114 connected to the power take-off shaft on the tractor. The reversing mechanism is provided so that the drive shaft 118 may rotate in either a clockwise or counterclockwise direction depending upon the position of the lever 114. The housing containing the reversing mechanism is detachable from the tractor by bolt means as at 115. The exact details of the reversing mechanism is not deemed necessary other than to recognize that such does exist as part of the drive means for rotating the rotatable shaft 105. However, should details of the reversing drive be desired, reference may be made to U.S. Patent 1,860,246 or to U.S. Patent 1,644,765, which show typical reversing mechanisms used in combination with a driven shaft. The extensible drive shaft 118 is constructed of a pair of telescoping members, the forward member 116 having a hollow square sectioned center, and the rear member 117 having a square cross section which will telescope in the hollow center of the forward member 116 while retaining its drive characteristic.

Provided on the forward end of the box channel 59 are a pair of ear lugs 120, 121. The lugs 120, 121 are apertured, as at 122 to receive a pin 126 connecting the rear end of an extensible link in the form of a hydraulic ram 124 and its associated cylinder 123. The forward end of the cylinder 123 is connected to the outwardly extending bracket 44 by means of a vertical pin 125. The hydraulic unit may therefore swing about its forward end and its rear end. It should also be noted that the right bracket 45 has an aperture 127 for receiving the hydraulic unit 123 should it be desired to connect it to that bracket. The hydraulic unit operates through hoses 128, 129 connected to the tractor hydraulic system 16.

The implement operates in the following manner. As shown in Fig. 1, the implement may be positioned in a fore-and-aft direction with the associated material container 52 positioned also in a fore-and-aft direction whereby the material may be forced over the right side wall 52 by the chains 109 and associated drags 110. The chains in Fig. 4 are shown in their extended position. However, in normal operation when the material container is completely full, the chains will first wrap around the shaft 105 until material adjacent the shaft is removed. The chains 109 and drag 110 will then tend to extend outwardly from the shaft 105 until the container 50 is completely relieved of material. The shaft 105 is shown to rotate in a clockwise direction, as indicated by the arrow A in Fig. 4 and consequently the material will be driven outwardly over the right wall 52.

Fig. 2 shows the hydraulic cylinder 123 and ram 124 in their extended position. In reaching this position, the material container 50 and its associated subframe is swung about the vertical pivot at the axis of the stub shaft 80 in a lateral direction so that the axis of the shaft 105 is inclined to the direction of travel. Also, the left side wall 51 is moved forward of the right side wall 52. In this position the material issuing over the right side wall 52 will be driven in a right rearward direction. The material container may be moved to this position for two purposes, the first being that should the wind be coming from the left rearward direction, the wind would tend to sweep the material issuing from the container to the right side of the tractor and second, the swath in which the material is thrown from the container is considerably wider by the margin that the shaft 105 is transversely disposed relative to the direction of travel. In this latter position, the material will be spread less thickly on the ground, but will be spread in a wider swath.

Should for purposes of evading the wind, the material be desired to be thrown over the left wall 51 of the material unloader, such may be accomplished by removing the shield 70 and placing it on the right side wall 52 by connecting the upper portion 72 of the hinge to the lower portion 74 on the right side wall. This will aid in directing the material over the left side wall 51. Also, by reversing the direction of rotation through the lever 114 on the reversing mechanism under the housing 17, the chains will rotate in a counterclockwise direction which will cause the material to flow over the left side wall 51. The hydraulic unit 123 will at this point be anchored to the right bracket 127 and either to the ear 120 or 121 depending on the amount of travel desired by the material container 50. It should here be noted that while only two ears 120, 121 have been shown, such were limited to two for the purposes of illustration only and any number will be satisfactory. Likewise, the ear brackets may be mounted any place on the subframe, the fact that they were shown on only the forward end also being for illustrative purposes.

While only one form of the invention has been shown, it should be recognized that other forms and variations will become apparent to those skilled in the art without departing from the broad principle herein taught. Therefore, it should be understood that the invention was described and shown in detail for the purposes of fully and concisely illustrating its principles and it is not desired to limit or narrow the invention beyond that which is broadly set forth in the appended claims.

What is claimed is:

1. A material unloading implement adapted for attachment to a tractor or other type of vehicle for effecting movement of the implement in a given direction of travel, said tractor having thereon a power take-off shaft, comprising: a main mobile implement frame attachable to the vehicle; a material container having an elongated body portion of U-shaped cross section including oppositely disposed upwardly extending side walls, and oppositely disposed end walls closing the ends of the body portion; a longitudinally extending rotatable shaft centrally located between the side walls and extending between the end walls; a plurality of arm elements axially spaced on the shaft, said arm elements being operative upon rotation of the shaft to discharge material over a side wall of the container; means mounting the material container on the main frame including vertical pivot means effective to permit lateral swinging of the container, and guide means radially spaced from the pivot means effective to resist vertical movement between the container and main frame; an extensible member between the main frame and container for effecting lateral movement of the container about the pivot means and to afford angular adjustment of the container relative to the direction of travel; and structure forming drive means extending from the tractor power take-off shaft to the rotatable shaft for effecting rotation of the latter, said drive means structure being automatically adjustable to accommodate lateral movement of the container without effecting rotation of the shaft.

2. A material unloading implement adapted for attachment to a tractor or other type of vehicle for effecting movement of the implement in a given direction of travel, said tractor having thereon a power take-off shaft, comprising: a main mobile implement frame attachable to the vehicle; a material container having an elongated body portion of U-shaped cross section including oppositely disposed upwardly extending side walls, and oppositely disposed end walls closing the ends of the body portion; a longitudinally extending rotatable shaft positioned between the side walls and extending between the end walls; a plurality of arm elements axially spaced on the shaft, said arm elements being operative upon rotation of the shaft to discharge material over a side wall of the container; means mounting the material container on the main frame including vertical pivot means effective to permit lateral swinging of the container; an extensible member between the main frame and container for effecting lateral movement of the container about the pivot means and to afford angular adjustment of the container relative to the direction of travel; and structure forming drive means extending from the tractor power take-off shaft to the rotatable shaft for effecting rotation of the latter, said drive means structure being automatically adjustable to accommodate lateral movement of the container without effecting rotation of the shaft.

3. A material unloading implement adapted for attachment to a tractor or other type of vehicle for effecting movement of the implement in a given direction of travel comprising: a main mobile implement frame attachable to the vehicle; a material container having an elongated body portion of U-shaped cross section including oppositely disposed upwardly extending side walls, and oppositely disposed end walls closing the ends of the body portion; a longitudinally extending rotatable shaft positioned between the side walls and extending between the end walls; a plurality of arm elements axially spaced on the shaft, said arm elements being operative upon rotation of the shaft to discharge material over a side wall of the container; means mounting the material container on the main frame including vertical pivot means effective to permit lateral swinging of the container; an extensible member between the main frame and container for effecting lateral movement of the container about the pivot means and to afford angular adjustment of the container relative to the direction of travel; and drive means structure attachable to the shaft for effecting rotation thereof.

4. A material unloading implement adapted for attachment to a tractor or other type of vehicle for effecting movement of the implement in a given direction of travel comprising: a main mobile implement frame attachable to the vehicle; a material container having an elongated body portion of U-shaped cross section including oppositely disposed upwardly extending side walls, and oppositely disposed end walls closing the ends of the body portion; a longitudinally extending rotatable shaft positioned between the side walls and extending between the end walls; a plurality of arm elements axially spaced on the shaft, said arm elements being operative upon rotation of the shaft to discharge material over a side wall of the container; means mounting the material container on the main frame including vertical pivot means effective to permit lateral swinging of the container; means between the main frame and container for effecting lateral movement of the container about the pivot means and to afford angular adjustment of the container relative to the direction of travel; and drive means structure supported on the frame for effecting rotation of the shaft.

5. A material unloading implement adapted for attachment to a tractor or other type of vehicle for effecting movement of the implement in a given direction of travel comprising: a main mobile implement frame attachable to the vehicle; a material container having an elongated body portion of U-shaped cross section including oppositely disposed upwardly extending side walls, and oppositely disposed end walls closing the ends of the body portion; a longitudinally extending rotatable shaft positioned between the side walls and extending between the end walls; a plurality of arm elements axially spaced on the shaft, said arm elements being operative upon rotation of the shaft to discharge material over a side wall of the container; means mounting the material container on the main frame including vertical pivot means effective to permit lateral swinging of the container; means between the main frame and container for effecting lateral movement of the container about the pivot means and to afford angular adjustment of the container relative to the direction of travel; a side wall extension; and attachment means on both of the side walls adapted to connect the extension to one of the side walls to extend the height of the side wall above that of the other side wall; and drive means supported on the frame for effecting rotation of the shaft.

6. A material unloading implement adapted for attachment to a tractor or other type of vehicle for effecting movement of the implement in a given direction of travel, said tractor having thereon a power take-off shaft, comprising: a main mobile implement frame attachable to the vehicle; an elongated material container having an elongated body portion of U-shaped cross section including oppositely disposed longitudinally and upwardly extending side walls; a longitudnially extending rotatable shaft positioned between the side walls; a plurality of arm elements axially spaced on the shaft, said arm elements being operative upon rotation of the shaft to discharge material over a side wall of the container; means mounting the material container on the main frame including vertical pivot means effective to permit lateral swinging of the container; means between the main frame and container for effecting lateral movement of the container about the pivot means and to afford angular adjustment of the container relative to the direction of travel so as to move either one of said side walls forwardly of the other; and structure forming drive means extending from the tractor power take-off shaft to the rotatable shaft for effecting rotation of the latter, said drive means structure being automatically adjustable to accommodate lateral movement of the container and adjustable to effect rotation of the shaft in either direction.

7. A material unloading implement adapted for attachment to a tractor or other type of vehicle for effecting movement of the implement in a given direction of travel, said tractor having thereon a power take-off shaft, comprising: a main mobile implement frame attachable to the vehicle and movable over a field in a given direction of travel; a material container having an elongated body portion of U-shaped cross section including oppositely disposed upwardly extending side walls, and oppositely disposed end walls closing the ends of the body portion; a longitudinally extending rotatable shaft disposed between the side walls and extending between the end walls; a plurality of arm elements axially spaced on the saft, said arm elements being operative upon rotation of the shaft to discharge material over a side of the container; means on the main frame effecting angular adjustment of the container relative to the direction of travel; and structure forming drive means extending from the tractor power take-off structure to the rotatable shaft for effecting rotation the latter, said drive means structure being automatically adjustable to accommodate lateral movement of the container.

8. A material unloading implement adapted for attachment to a tractor or other type of vehicle for effecting movement of the implement in a given direction of travel, said tractor having thereon a power take-off shaft, comprising: a main mobile implement frame attachable to the vehicle and movable over a field in a given direction of travel; a material container having an elongated body portion of U-shaped cross section including oppositely disposed upwardly extending side walls, and oppositely disposed end walls closing the ends of the body portion; a longitudinally extending rotatable shaft located between the side walls and extending between the end walls; a plurality of arm elements axially spaced on the shaft, said arm elements being operative upon rotation of the shaft to discharge material over a side of the container; means on the main frame effecting angular adjustment of the container relative to the direction of travel; and structure forming drive means extending from the tractor power take-off shaft to the rotatable shaft for effecting rotation the latter, said drive means being adjustable to effect rotation of the shaft in either direction.

References Cited in the file of this patent

UNITED STATES PATENTS

| 1,657,393 | Hase | Jan. 24, 1928 |
| 1,698,724 | Johnston et al. | Jan. 15, 1929 |
| 2,520,229 | Trauger | Aug. 29, 1950 |
| 2,527,974 | Tostenrud et al. | Oct. 31, 1950 |
| 2,764,075 | Fowler | Sept. 25, 1956 |

FOREIGN PATENTS

| 299,827 | Germany | Aug. 11, 1917 |

UNITED STATES PATENT OFFICE
CERTIFICATE OF CORRECTION

August 18, 1959

Patent No. 2,900,193

Billie L. Harriott

It is hereby certified that error appears in the printed specification of the above numbered patent requiring correction and that the said Letters Patent should read as corrected below.

Column 8, line 3, for "saft" read -- shaft --; line 8, for "structure" read -- shaft --; lines 9 and 31, after "rotation" insert -- of --; same column 8, line 14, for "given" read -- forward --.

Signed and sealed this 16th day of February 1960.

(SEAL)
Attest:

KARL H. AXLINE
Attesting Officer

ROBERT C. WATSON
Commissioner of Patents